July 17, 1962  J. T. HARTMEISTER  3,044,344
RANGE FINDING DEVICE
Filed April 15, 1960
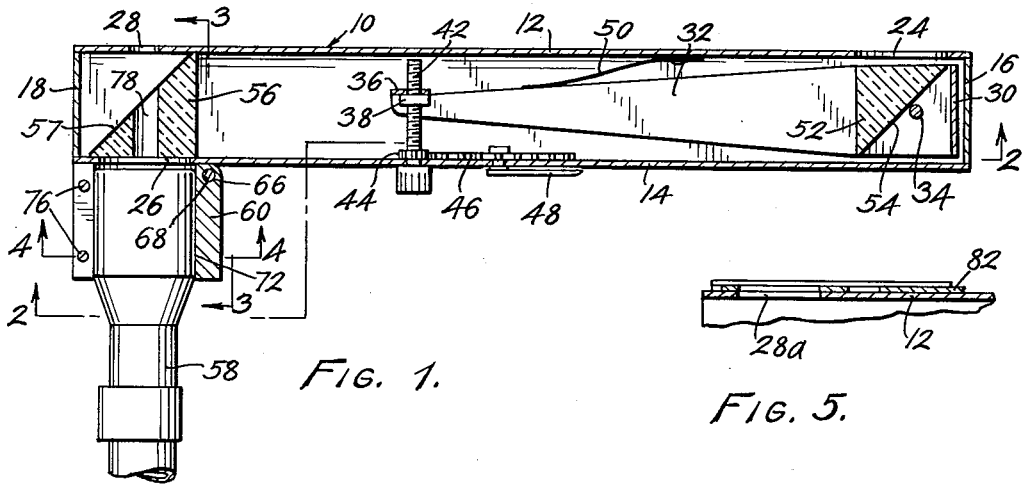
FIG. 1.
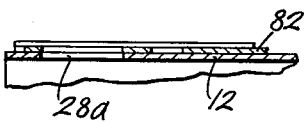
FIG. 5.
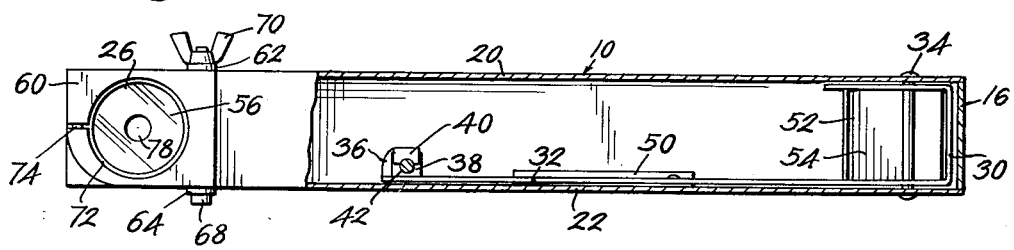
FIG. 2.
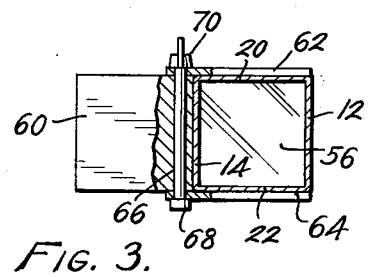
FIG. 3.
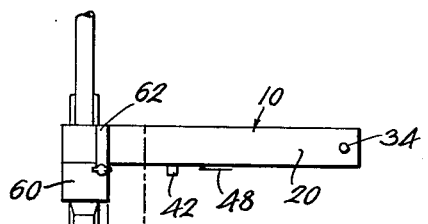
FIG. 4.
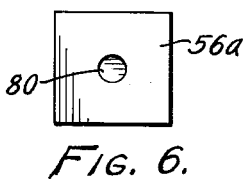
FIG. 6.
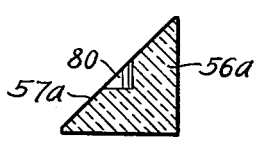
FIG. 7.
FIG. 8.
INVENTOR.
JOEL T. HARTMEISTER
BY Anderson, Spangler & Wymore
ATTORNEYS

United States Patent Office 3,044,344
Patented July 17, 1962

3,044,344
RANGE FINDING DEVICE
Joel T. Hartmeister, 1544 Lowell Blvd., Denver 4, Colo.
Filed Apr. 15, 1960, Ser. No. 22,449
2 Claims. (Cl. 88—2.4)

This invention relates to a range finding device and more particularly to a range finding device suitable for use with an optical system such as a telescopic sight used on small bore rifles.

Numerous attempts have been made in the past to provide an acceptable range finding device for use on game rifles and have met with varying success. Attempts have been made to adapt range finding devices as used in photography, but where telescopic sights are used, after spotting his target in the scope, the hunter must, of necessity, remove his eye from the eye piece of the scope and sight through the range finder to determine distance to the target. A means of determining the distance to the target is more important when using a scope, rather than open sights, as distance is much more difficult to judge through the scope.

Where the existing split image range finding devices using split prisms or half silvered mirrors are attempted to be used in conjunction with a telescopic sight, the optics of the scope completely destroys the usual split image frustrating the attempt.

It is an object of this invention to provide an improved range finding device which can be sighted through the optical system of a telescopic sight to take advantage of target magnification while providing good split image resolution.

It is a further object of this invention to provide an improved range finding device which avoids one or more of the disadvantages of the prior-art arrangements and which provides a true coincidence resolution.

It is a further object of this invention to provide an improved range finding device which is sturdy, economical to manufacture and is attractive in appearance.

For a better understanding of the present invention, together with other and further objects thereof, reference is had to the following description taken in connection with the accompanying drawing and its scope will be pointed out in the appended claims.

In the drawing:

FIGURE 1 is a cross-sectional plan view of one embodiment of the invention showing the internal arrangement, FIGURE 2 is a view, partly in section, taken along line 2—2 of FIGURE 1, FIGURE 3 is a view, partly in section, taken along line 3—3 of FIGURE 1, FIGURE 4 is a view in cross-section taken along line 4—4 of FIGURE 1, FIGURE 5 is a cross-sectional view, partly broken away to conserve space, showing a light gathering aperture and means for varying the size thereof, FIGURE 6 is an elevational view of another form of image splitting prism according to the invention, FIGURE 7 is a cross-sectional view in plan of the prism of FIGURE 6, and, FIGURE 8 is an over-all view of the invention mounted upon a telescopic sight of a rifle and illustrating the folded position for storage in dotted lines.

Referring to the drawing, the range finding device of this invention is seen to comprise an elongated housing or box 10 having sides 12 and 14, ends 16 and 18, a top 20 and a bottom 22. The box 10 is light proof, preferably having the interior painted black to avoid reflections, and sides 12 and 14 are provided with openings 24 and 26 respectively therein adjacent opposite ends 16 and 18.

Side 12 is further provided with an opening 28 in line with the opening 26 in side 14.

A U-bracket 30, having an arm 32 connected to one leg, is pivotally mounted within box 10 adjacent end 16 as by means of a pin 34 journalled for rotation in holes in top 20 and bottom 22. Arm 32, remote from the pivot mounting, is provided with an upturned portion 36 having an opening therethrough. A nut 38 is mounted on the upturned portion in alignment with this opening and secured against movement with respect thereto by means of lip 40. A stud bolt 42, having a knurled head is journalled for rotation in a hole in side 14 in near alignment with nut 38 with bolt 42 being threaded thereinto. A gear 44 is secured to bolt 42 on the side of side 14 opposite the head forming a collar to restrain bolt 42 against relative movement with respect to side 14. A second gear 46, is mounted for rotation on side 14 inside box 10 by means of a shaft passing through side 14 and connected to a pointer 48. To avoid backlash between bolt 42 and nut 38, arm 32 can be biased toward nut 38 as by means of spring 50 and the like.

A prism 52, having a silvered surface 54, is secured between the legs of U-bracket 30 with the reflecting surface facing opening 24 in side 12. A beam combining prism 56, having a mirrored surface 57, is positioned within box 10 adjacent end 18 thereof intermediate openings 26 and 28 in sides 14 and 12 respectively with the mirrored surface facing opening 26. Prism 56 is secured in position by means of a suitable adhesive and the like.

The range finding device is mounted upon a telescope 58 by means of a clamp 60 hingedly connected to the range finding device. The hinged connection is seen to comprise a pair of straps 62 and 64 fastened respectively to top 20 and bottom 22 of box 10 by suitable means. Straps 62 and 64 extend beyond side 14 and are provided with aligned bores. Clamp 60 is provided with a bore 66, bolt 68 with bore 66 and the bores in the straps form a hinged connection between clamp 60 and box 10. A wing nut 70 secures bolt 68 to complete the connection.

Clamp 60 is provided with a bore 72 and the clamp is mounted on box 10 such that bore 72 is aligned with openings 26 and 28 in sides 14 and 12. Clamp 60 is provided with a slit 74 along one side of bore 72. One or more stud bolts 76 is passed through an opening to one side of the slit 74 of clamp 60 and is threaded into the side of clamp 60 to the other side of slit 74. Bore 72 is of a size sufficient to receive the end of the telescope 58 and be securely clamped thereto by the tightening of bolts 76.

An extremely important aspect of the instant invention is found in the beam combining prism 56, which for the sake of clarity will be called the primary prism. The usual method of developing images in a range finding device comprises a prism or mirror having one-half silvered and the other half not silvered. One image is directly viewable through the unsilvered portion while a second image is reflected from the other, or secondary prism, to the silvered portion where it is viewed.

When such a system is attempted to be used with a telescopic sight, the optical system of the scope will not accept the images so produced. As the object lens of the scope serves as a light gathering element, dividing the light reaching this lens along a diameter will not produce a usable separation of the image.

The applicant has found that this inherent deficiency can be overcome by viewing one image through a central portion of the lens system while viewing the other image through the balance thereof. This is best accomplished in practice by providing an unsilvered centrally located portion in primary prism, while the image from the secondary prism is viewed on the silvered area of the primary prism surrounding the centrally located unsilvered area.

The quality of the optical system in a telescopic sight will in large part determine whether it is necessary for the line of sight of the viewer to substantially coincide with the optical axis of the scope. With a good optical system, the line of sight, or the position of the viewer's eye at the eyepiece need not coincide with the optical axis but may be off-center without resulting in objectional distortion of the image. With a lower quality optical system the amount of deviation from the optical axis becomes increasingly smaller for satisfactory results.

Referring to FIGURE 1, primary prism 56 is seen to be provided with an aperture or bore 78 therein in substantial axial alignment with openings 26 and 28 in sides 14 and 12. FIGURES 6 and 7 show another embodiment of the primary prism identified as 56a. As best seen in FIGURE 7, prism 56a is provided with a bottomed bore 80 through the silvered surface 57a of the prism. The bottom of bore 80 is preferably parallel to surface through which the images are viewed to avoid objectional reflections.

It has been found that bores 78 and 80 can be of a size up to and including about 10% of the area of the object lens of a scope, the lens furtherest removed from the user's eye. The use of a larger bore results in a deterioration of the image separation and clarity. It is further found, where using a bore constituting about 10% of the area of the object lens, that displacement of the bore more than one diameter off the optical axis of the scope fails to produce a satisfactory image combination. The amount of displacement permissable will further depend on the quality of the optical system. With a lower quality system, less displacement can be tolerated.

While the invention has been described and illustrated with the use of prisms, those skilled in the art will recognize that the same principles can be applied utilizing silvered mirrors having an opening in the silvered surface or a physical opening through the mirror structure corresponding to bore 78.

As seen in FIGURE 5, side 12 may be provided with a large opening 28a adjacent end 18. An adjustable slide 82 provided with various sized openings therein may be mounted by suitable means for selectively positioning one such opening in alignment with opening 26a to vary the amount of light passing therethrough to prism 56. This affords a means for balancing the light between a primary image and the secondary image. Various arrangements may be utilized and colored filters may be mounted in the slide for improved contrast between the images.

Telescope 58 is preferably mounted on a rifle for tiltable movement in a vertical plane relative to the rifle. The range finding device is calibrated, as well known in the art, by sighting therethrough to a target at known distances from the viewer. The images are superimposed by adjusting the knurled knob of stud 42 and the distance is marked on front 19 opposite the position of pointer 48. A raising or lowering of the telescopic sight will then be made to correspond to the proper elevation for the distance to the target with the ammunition being used so that the trajectory of the projectile will pass through the target.

When not in use, the range finding device may be folded into the position shown in dotted lines in FIGURE 8 by loosening nut 70 and pivoting the device about the hinged connection between clamp 60 and box 10.

Although the above-described embodiments disclose the invention as applied to the telescopic sight of a small bore rifle, it is to be understood that the invention may also be employed with similar sights for large rifles or generally in combination with an optical system where image magnification is desired.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A range finding device for use with a magnifying optical system comprising an elongated housing closed at both ends, having sides, a top and a bottom; openings in one side adjacent each end of the housing; a viewing aperture in the other side in line with one of said openings in said one side; a fixed reflector mounted at an angle within the housing and positioned between the viewing aperture and the opening in line therewith; a movable reflector mounted for pivotal movement within the housing in line with the other opening in said one side and means operatively engaging said movable reflector for the selective angular positioning of same with respect to the fixed reflector, said fixed reflector having a centrally located transparent area therein, wherein the fixed reflector comprises a triangular prism having a reflecting surface on the surface of the prism containing the hypotenuse, the center of the centrally located transparent area is positioned on a line parallel to one side of the prism and a projection of the transparent area along said line onto a plane normal to said one side of the prism is substantially circular, wherein the prism is provided with a centrally located bottomed bore through the reflecting surface terminating within the prism and parallel with one of its sides.

2. A range finding device for use with a magnifying optical system comprising an elongated housing closed at both ends, having sides, a top and a bottom; openings in one side adjacent each end of the housing, a viewing aperture in the other side in line with one of said openings in said one side; a fixed reflector comprising a triangular prism mounted at an angle within the housing and positioned between the viewing aperture and the opening in line therewith; a movable reflector mounted for pivotal movement within the housing in line with the other opening in said one side and means operatively engaging said movable reflector for the selective angular positioning of same with respect to the fixed reflector, said fixed reflector having a centrally located bottomed bore through the reflecting angular surface terminating within the prism and parallel with one of its sides.

References Cited in the file of this patent

UNITED STATES PATENTS

| | | |
|---|---|---|
| 760,545 | Miller | May 24, 1904 |
| 798,931 | Staal et al. | Sept. 5, 1905 |
| 2,058,484 | Mihalyi | Oct. 27, 1936 |
| 2,119,542 | Kaspereit | June 7, 1938 |
| 2,119,543 | Kaspereit | June 7, 1938 |
| 2,155,389 | Arden | Apr. 25, 1939 |
| 2,386,614 | Kaprelian | Oct. 9, 1945 |
| 2,627,779 | Szelwach | Feb. 10, 1953 |

FOREIGN PATENTS

| | | |
|---|---|---|
| 904,510 | France | Mar. 5, 1945 |